Aug. 19, 1952     C. A. MARTIN     2,607,436
DUST SEPARATOR

Filed July 31, 1948                                      5 Sheets—Sheet 1

INVENTOR.
Charles A. Martin
BY
Attorneys.

Aug. 19, 1952     C. A. MARTIN     2,607,436
DUST SEPARATOR

Filed July 31, 1948     5 Sheets—Sheet 4

INVENTOR.
Charles A. Martin
BY
Attorneys.

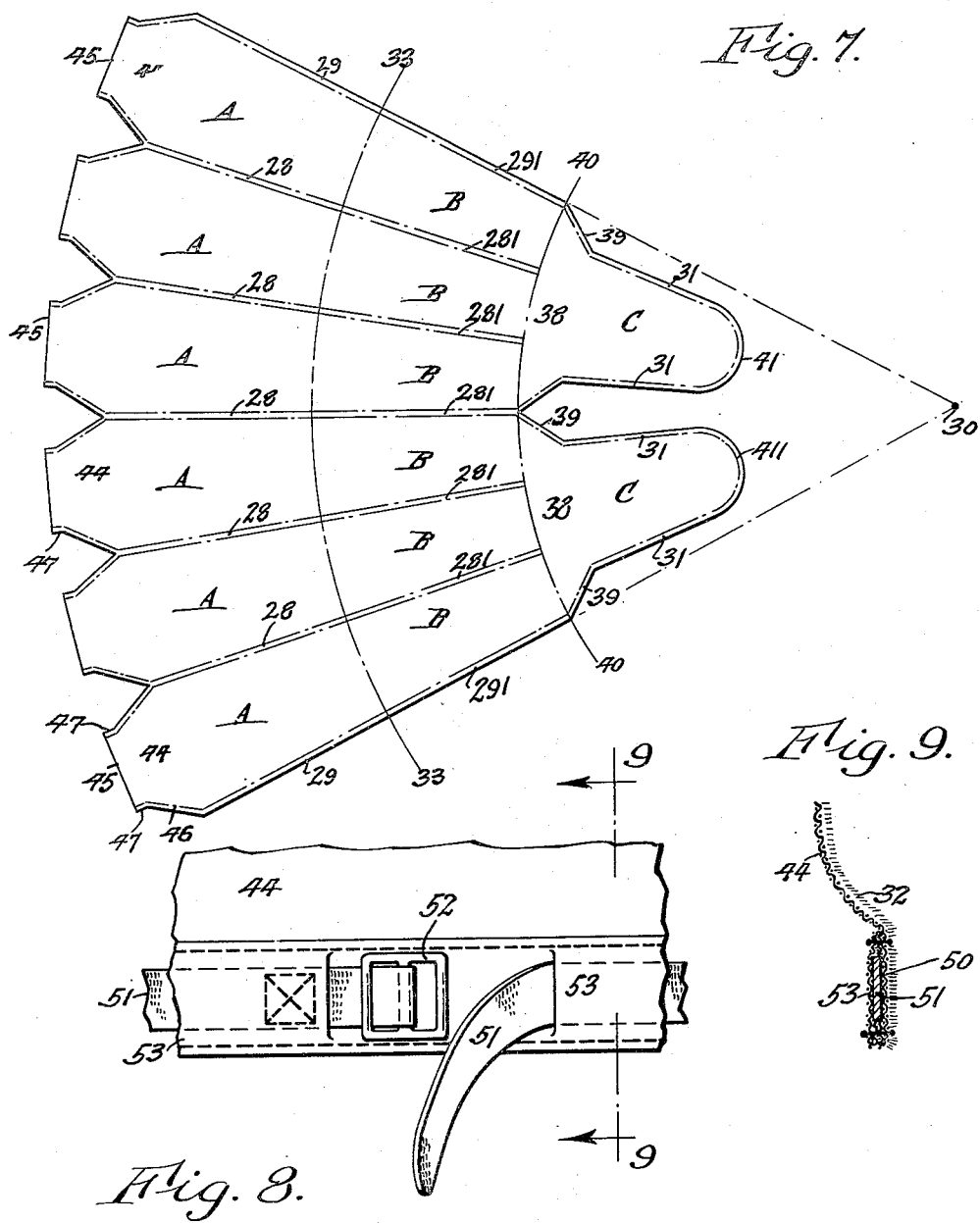

Patented Aug. 19, 1952

2,607,436

UNITED STATES PATENT OFFICE 2,607,436

DUST SEPARATOR

Charles A. Martin, Buffalo, N. Y.

Application July 31, 1948, Serial No. 41,869

1 Claim. (Cl. 183—51)

This invention relates to a dust separator and collector which is adapted to separate dust from dust-laden air and retain the same for subsequent disposition but permit the purified air to escape to the outer atmosphere.

Although this dust separator is more particularly designed for separating and collecting dust which is produced by cutting tile, building blocks and the like, the same is useful in other installations where it is desirable to dispose of dust so as to avoid scattering the same over the premises, where it jeopardizes the health of the worker and can cause serious damage to other machines and equipment.

This dust separator is of the type in which bags or tubes of porous woven fabric are employed as filtering, screening or sieve elements for effecting separation of the dust and air.

One of the objects of this invention is to provide a dust separator of this character in which the filtering bags forming the screening or filtering area are arranged more compactly and thus effect greater efficiency in operation and economy in the use of space.

A further object of this invention is the production of a separator of this type which can be easily emptied of the separated dust which has collected therein and thus easily maintain the apparatus in a condition of maximum efficiency.

A still further object of this invention is to so construct the same that it can be compactly folded for convenience of transportation and thus enable the apparatus to be easily and conveniently used on jobs which are located in different places.

Figure 1:
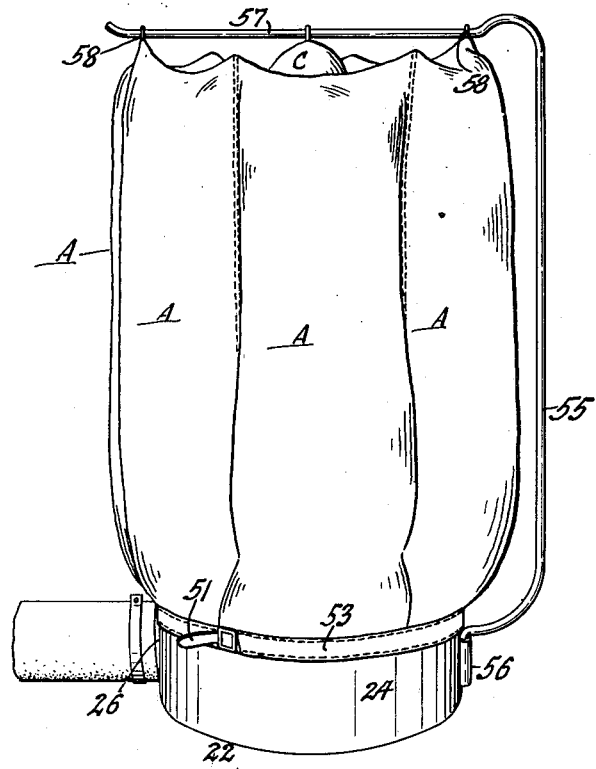
Fig. 1 is a perspective view of a dust separator or collector embodying this invention showing the same in an expanded or operative position.
Figure 2:
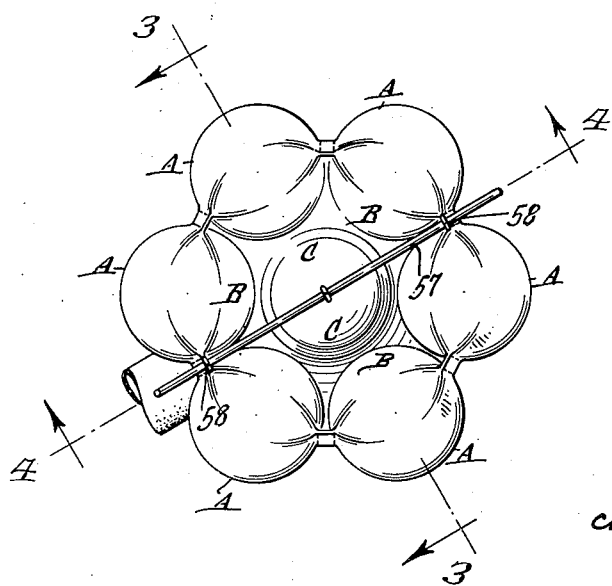
Fig. 2 is a top plan view of the same.
Figure 3:
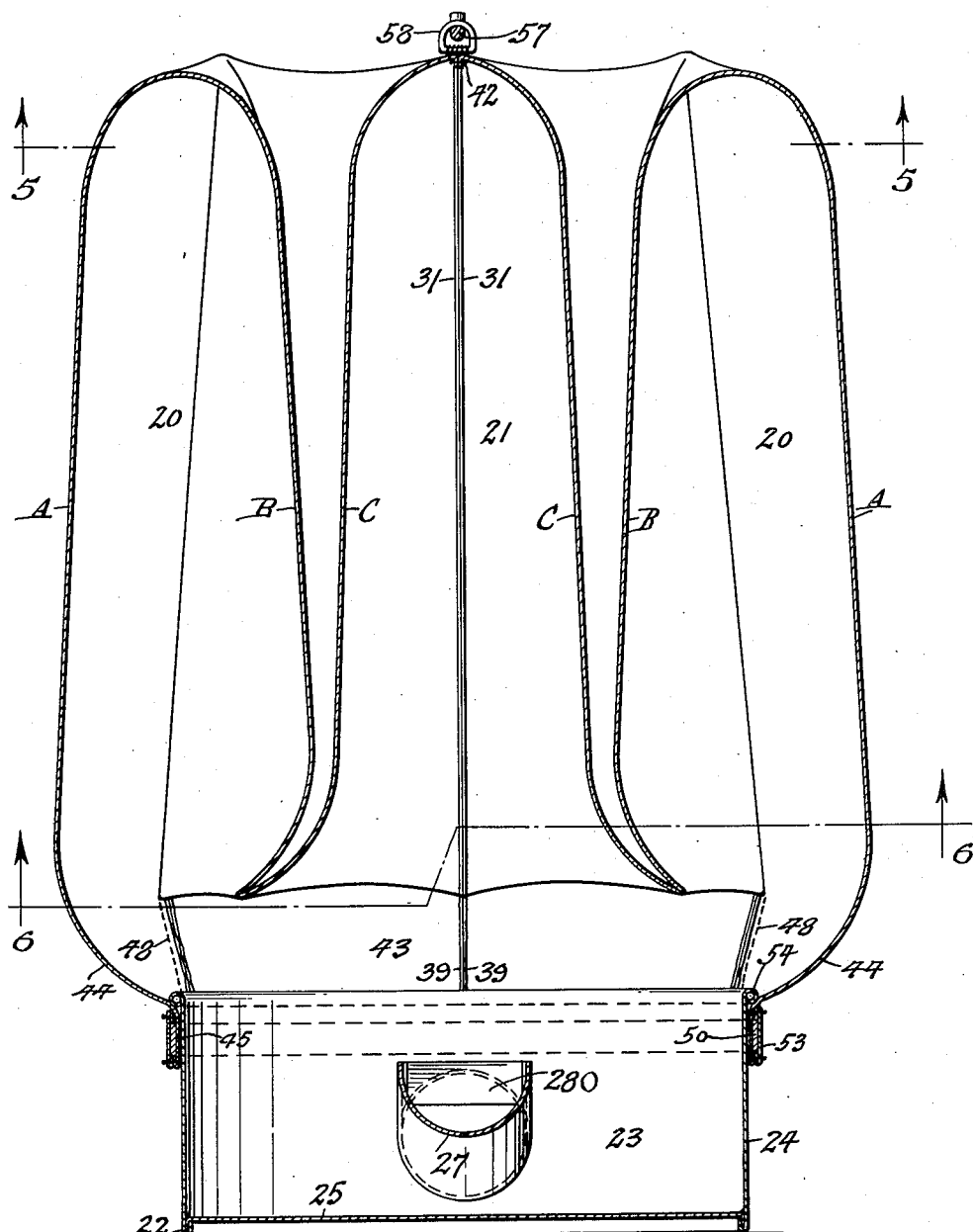
Figure 4:
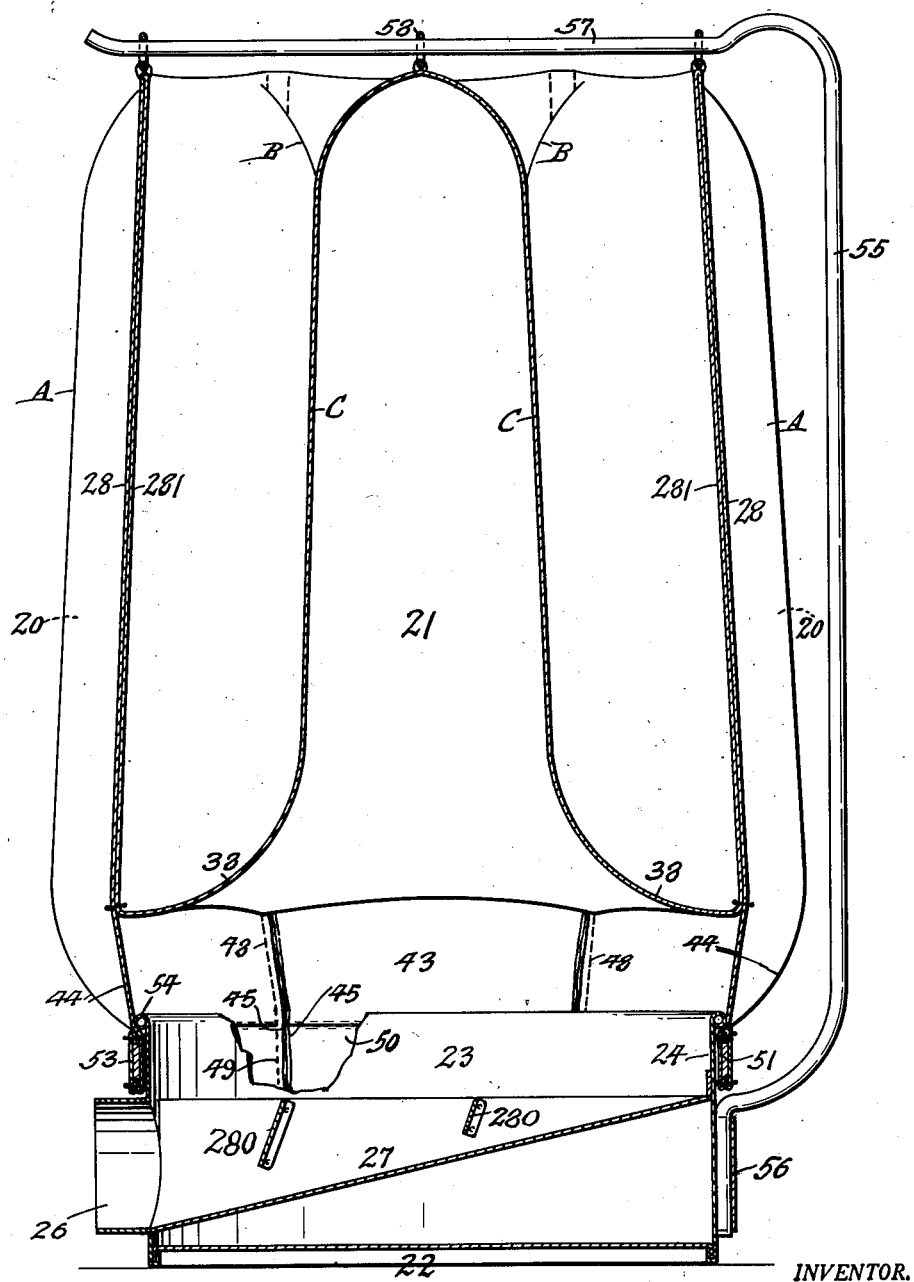

Figs. 3 and 4 are vertical transverse sections of the same at right angles to one another, taken on lines 3—3 and 4—4, Fig. 2, respectively.

Figure 5:
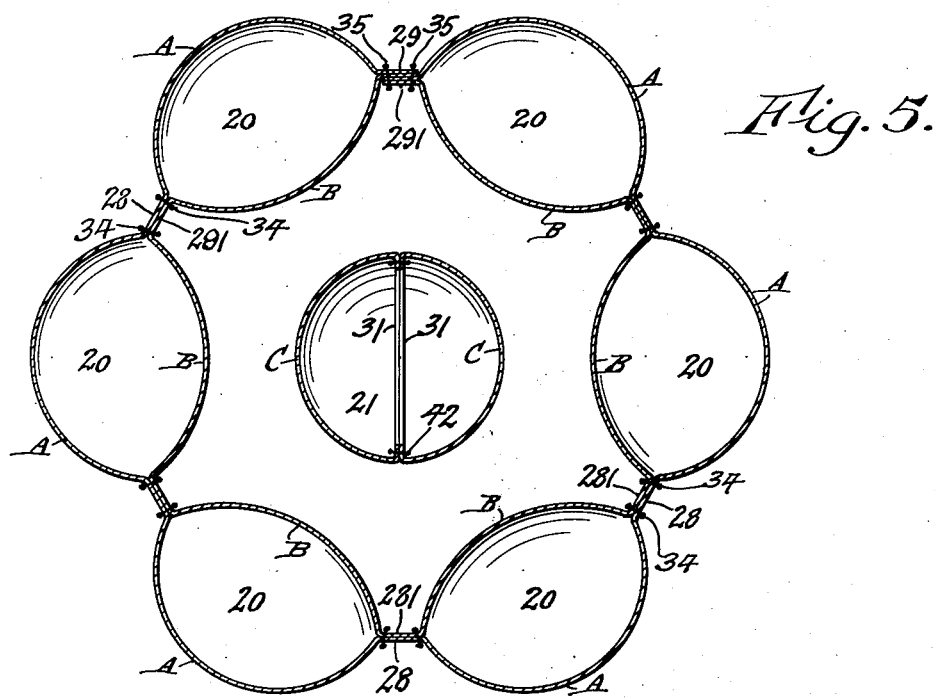
Figure 6:
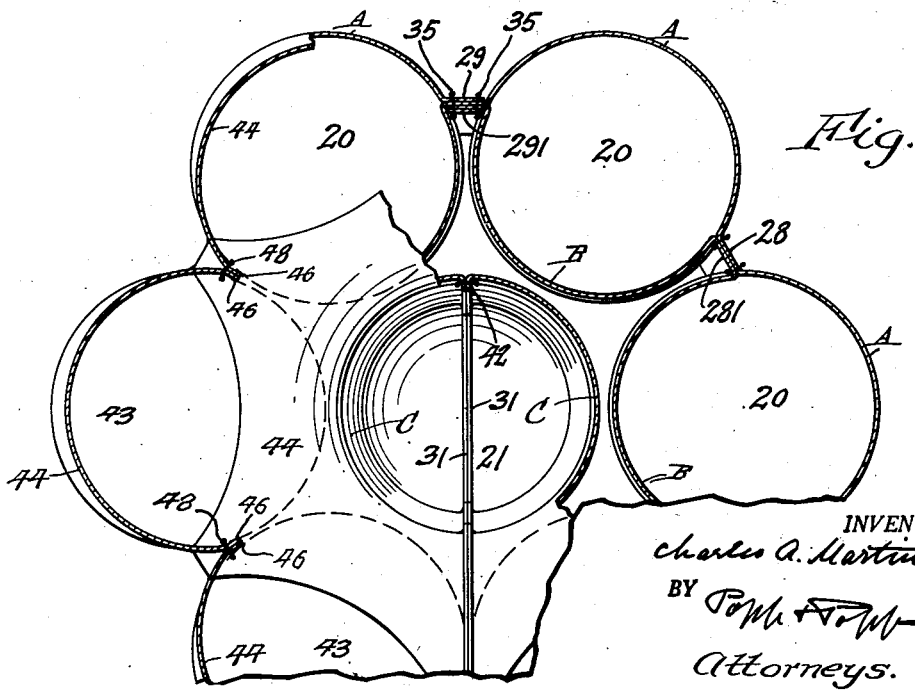

Figs. 5 and 6 are horizontal sections taken on the correspondingly numbered lines in Fig. 3.

Fig. 7 is a plan view, on a reduced scale, of the blank of porous sheet material or fabric from which the filtering or screen bags are constructed.

Fig. 8 is a fragmentary side elevation of the fastening means whereby the lower parts of the filter bags are secured to the base of the apparatus.

Fig. 9 is a fragmentary vertical section taken on line 9—9, Fig. 8.

In the following description the same reference characters indicate like parts in the several figures of the drawings.

In general this dust separator comprises a plurality of outer filter bags or tubes 20 which are arranged in an annular row about a vertical axis, an inner or central filter bag or tube 21 arranged centrally within the annular row of outer filter bags, and a hollow base 22 upon which the lower parts of these bags are mounted. The several filter bags are closed at the top thereof while the lower ends of the same are open and communicate with a manifold or distributing chamber 23 in the base to receive dust laden air therefrom. When the apparatus is not in use the several filter bags are collapsed but when the same is in operation the filter bags are expanded by the pressure of the dust laden air which is blown into the same, at which time these bags stand in an upright position.

The base of the dust separator may be variously constructed but the same preferably comprises a cylindrical upright side wall 24 and a horizontal bottom 25 which encloses a space constituting the manifold chamber 23 through which the dust laden air is delivered into the filter bags and into which the dust separated from the air drops by gravity from the inner side of these bags.

This base may rest on the floor or other support and is provided with an inlet 26 in a part of its side wall through which the dust laden air is delivered into the distributing chamber under pressure from the source where the dust is produced.

Within the distributing chamber means are arranged whereby the stream of dust laden air entering the same is spread or divided and caused to enter in substantially uniform amounts into the several filter bags and thus utilize all parts of the filtering area of the bags. The means for this purpose, which are shown in the drawings, comprise a trough-shaped conduit 27 extending diametrically across the distributing chamber from the inlet 26 to the opposite side of the wall 24 and gradually diminishing in cross-sectional area from this inlet to the opposite side of this chamber. A plurality of inclined baffles 280 also extend across the interior of this conduit at different points or places in the length thereof, as shown in Figs. 3 and 4. As the stream of dust laden air passes lengthwise through this conduit the same gradually escapes from the top of this conduit into the chamber with gradually decreasing volume, due to the tapering form of this trough which causes this volume to be greater adjacent to those bags which are near the inlet 26 and smaller adjacent to those bags which are remote from this inlet. The baffles also cause the dust laden air in passing lengthwise through this trough to be deflected from the latter upwardly at different points of the same into the distributing chamber and thus further aid in producing substantially uniform flow of dust laden air into the several filter bags.

Although the plurality of outer and central filter bags may be fabricated in any suitable manner the same are preferably constructed as follows:

It has been found that an outer annular row of six filter bags spaced equidistant around the vertical axis of the manifold chamber and a single filter bag arranged axially within this row of outer bags is a satisfactory arrangement inasmuch as this permits all of these bags to be advantageously made from a single blank of sheet material the threads of which are interwoven sufficiently loose to produce a screening or filtering effect the dust being retained on the inner surfaces of these bags while the air passes through the meshes of the material to the exterior of the bags. This separation is facilitated by providing the inner side of this filter sheet with a pile or nap 32, as shown in Fig. 9, which latter has the capacity of trapping or catching the dust and holding the same as the filtering operation progresses the same accumulates on the filter surface but in time falls off by gravity into the distributing chamber.

The preferred form of the blank of filter sheet material for making the filter bags and associated parts in accordance with this invention is shown in Fig. 7 and comprises six outer wall sections A, arranged side by side in a curved row which has its axis located at a common center 30, six inner wall sections B arranged side by side in a curved row which has its axis also located at the common center 30 and the outer ends of said inner wall sections being connected respectively, with the inner ends of the outer wall sections A along a folding line 33 which is curved from an axis located at the common center 30, and two center bag sections C of inwardly tapering form arranged side by side and each having its outer end connected by an inwardly tapering neck section 38 with the inner ends of a group of three adjacent inner wall sections B along a folding line 40 which is curved from the common center 30 as an axis. The inner end of each center wall section C is of curved form as shown at 41. The longitudinal edges of the tapering outer wall sections A, inner wall sections B, and center wall sections C are all arranged on lines which radiate from the common center 30 as an axis.

The intermediate members of the row of outer wall sections A have their opposing longitudinal edges connected respectively by outer radial web members 28 while the extreme longitudinal edges of the endmost outer wall sections A are provided with end web members 29. The intermediate members of the row of inner wall sections B have their opposing longitudinal edge connected respectively by inner radial web members 281 while the extreme longitudinal edges of the endmost inner wall sections B are provided with radial web members 291. The longitudinal edges of each center wall section C are provided with seam flanges 31 which radiate from the common center 30 as an axis, the curved inner end 41 of each center wall section C is provided with a curved seam flange 411 and the inwardly converging side edges of each neck wall section 38 are provided with same flanges 39 of corresponding shape.

In making the filter bags from this blank the outer wall sections A are folded on the line 33 so that these sections are arranged under the inner wall sections B and the longitudinal web members 28, 29 engage with the corresponding web members 281, 291 of the inner wall sections thereby forming two ply webs between the opposing external sides of the outer filter bags and a two ply web flange on the exterior of each endmost outer filter bag.

The plies of each web formed by two members 28, 281 are connected by two rows of stitches 34 which are spaced transversely from each other but each of these rows of stitches is arranged close to the exterior of the respective outer filter bag, thereby preventing contact between the outer surface of adjacent outer filter bags and causing each of these bags to expose the maximum amount of its filtering area for securing the greatest filtering effect therefrom.

The stitching connecting the outer and inner wall sections of the respective outer filter bags at their longitudinal edges forms seams which are preferably arranged on the exterior of these bags, as shown in Figs. 4–6.

A similar spacing effect is produced between the opposing sides of the endmost outer filter bags when the same are assembled in annular rows by lapping the two ply web flanges 29, 291 on one endmost outer filter bag over the companion two ply web flanges 29, 291 of the other endmost filter bag and thereby form a four ply web between the opposing external sides of the endmost filter bag, as shown at the top of Figs. 5 and 6. The web members of this four ply web are connected by two longitudinal rows of stitches 35, 35 which are spaced from one another and each row connecting the members of this four-ply web next to the exterior of one of the endmost outer filter bags, as shown in Figs. 5 and 6. Each of said wall sections C and its neck is folded relative to the inner wall sections B of the triple group of outer filter bags along the folding line 40 and the corresponding edge flanges 31, 39 and 411 of these walls are engaged with each other and by a row of stitches 42 forming a seam on the interior of these members, as shown in Figs. 3, 5 and 6, when the separator is completed and in an operative condition.

When the making of the dust separator has progressed thus far a filtering area is provided which comprises a plurality of upright filter bags 20 arranged in an annular row and a single upright filter bag 21 arranged centrally within this annular row, each filtering bag being closed at its upper end and at its sides and open at its lower end for admitting dust laden air into the same. In this organization the two side wall sections of the center filter bag are of the same size, but the outer wall section of each outer filter bag is somewhat wider than the companion inner wall section of the respective outer filter bag, thereby compensating for the difference in the greater circumference of the outer walls of these outer filter bags which are farther from the axis of the separator as compared with the smaller circumference of the inner walls of these bags which are nearer to this axis, as shown in Fig. 5.

This relative formation of the outer and inner walls of the annular row of outer filter bags is advantageously obtained by making the same from a blank of filtering sheet material which comprises a plurality of tapering sections, each of which provides an outer and an inner wall for one of the outer filter bags, and the several sections taper toward a common axis or center 39, as shown in Fig. 7.

Between the top of the distributing chamber 23 and the lower ends of the several filter bags a throat 43 is provided through which the dust laden air is conducted from the distributing chamber to the several filter bags. The walls of this throat are preferably made of filtering cloth or fabric similar to that used for making the walls of the filtering bags and means are provided for detachably connecting the wall of this throat with the distributing chamber to facilitate inspection, repairing, cleaning and emptying the apparatus.

For this purpose the outwardly converging flanges 46 of the several flaps 44 of adjacent outer filter bag walls are connected with each other by a row of stitches 48 so that this throat tapers, as shown in Figs. 3 and 4.

The tab 45 at the outer end of each of the flaps 44 is provided on its laterally opposite edges with parallel seam flanges 47 which are sewed together by a longitudinal row 49 of stitches to form a tubular or cylindrical collar 50. This collar surrounds the upper part of the side wall 24 of the base and is detachably secured thereto by a fastening band or belt 51 engaging the outer side of this collar and having its ends detachably connected with each other by a buckle 52. This belt or band is prevented from becoming displaced on this collar by passing the same through a retaining tube or loop 53 secured to the outer side of this collar. The latter is preferably secured to the wall of the base below a bead 54 on the latter, as shown in Figs. 3 and 4 and thereby prevent the throat from being accidentally pulled off the base.

When the separator is in use the several bags are blown up into a distended condition by the pressure of the dust laden air against the inner side of the same, as shown in Figs. 1, 2, 3, 4, 5 and 6, but when the apparatus is not in use the filter bags may either allow to drop by their weight into collapsed condition, or the same may be held in a suspended position by a support which may include an upright rod 55 arranged on one side of the bags and having its lower end seated in a socket 56 on the base of the apparatus and a horizontal arm 57 arranged on the upper end of this rod and engaging with rings 58 on the upper ends of some of the filter bags, as shown in Figs. 1, 2, 3 and 4.

By forming the several filter bags, flaps and tabs from a single continuous sheet or piece of porous fabric it is possible to readily and accurately match the companion parts of each of these members so that the same are of the required tubular form, and it also permits of connecting the companion walls of each tubular member by sewing or stitching with ease and facility and thereby produce these filtering members economically and in a manner that they will operate with the greatest efficiency.

It will be noted that in this dust separator each of the several filter bags or tubes is tapered from its inlet end toward its closed end so that the same is generally of conical shape. Due to this design some of the dust is filtered out of the air immediately upon entering the respective bag and this operation continues progressively as the dust-laden air travels farther into the bag which is of gradually decreasing area, thereby adapting the filtering arch of the bag to the amount of dust-laden air which it operates upon and securing the maximum efficiency of the bags as a whole from an aerodynamic standpoint.

This dust separator is very efficient in operation, the same can be readily transported and erected for use in different places, the same can be easily serviced, and it also provides a maximum capacity for a given amount of space which is available for the installation of such apparatus.

I claim:

A dust separator, comprising an upright central filter bag, a plurality of upright outer filter bags arranged in an annular row around said central bag, each of said bags being closed at its upper end and its cross-sectional area progressively decreasing from its lower toward its upper end, a downward tubular extension forming a throat for introducing dust laden air into the lower ends of said bags, a distributing chamber having a bottom and a circular side wall open at its top, the lower end of said extension being connected to said side wall to establish communication between said chamber and throat, said side wall being provided with an inlet for dust laden air, an upwardly opening trough-shaped conduit extending across said chamber from the inlet side thereof toward the opposite side of the same and decreasing in cross-sectional area from said inlet toward said opposite side, and baffles arranged transversely of said conduit and at spaced intervals along the length thereof and arranged to direct upwardly part of the stream of incoming dust laden air.

CHARLES A. MARTIN.

REFERENCES CITED

The following references are of record in the file of this patent:

UNITED STATES PATENTS

| Number | Name | Date |
| --- | --- | --- |
| 842,529 | Dittmar | Jan. 29, 1907 |
| 1,114,058 | Spencer | Oct. 20, 1914 |
| 1,363,753 | Quinn | Dec. 28, 1920 |
| 1,743,934 | Ruemelin | Jan. 14, 1930 |
| 1,761,377 | Waring | June 3, 1930 |
| 2,133,141 | Holm-Hansen | Oct. 11, 1938 |
| 2,364,069 | Hahn | Dec. 5, 1944 |
| 2,431,888 | Pick | Dec. 2, 1947 |